March 5, 1963 H. H. RYAN 3,079,688
LINOLEUM CUTTER
Filed April 10, 1961
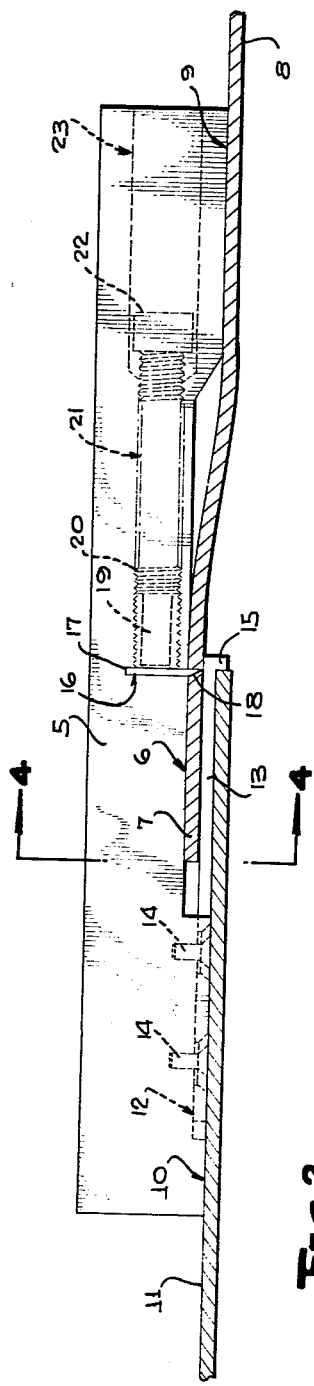
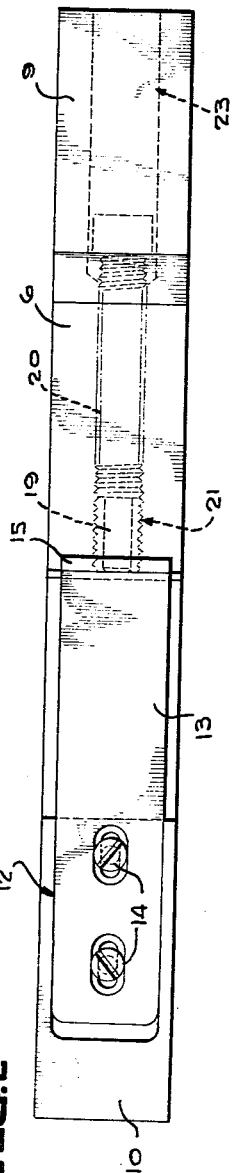
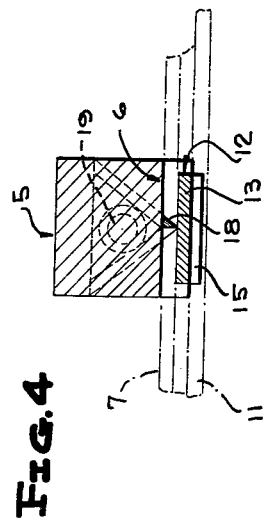
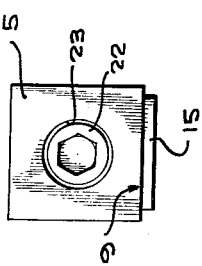
INVENTOR
HARRY H. RYAN
BY
ATTORNEYS

United States Patent Office 3,079,688
Patented Mar. 5, 1963

3,079,688
LINOLEUM CUTTER
Harry H. Ryan, 3518 Patrick Ave., Richmond 22, Va.
Filed Apr. 10, 1961, Ser. No. 102,017
7 Claims. (Cl. 30—294)

The invention relates generally to manually operable cutting tools and seeks to provide a novel, economically constructed and very efficient tool especially designed for use in cutting linoleum in a manner for assuring the provision of accurately aligned butt seams during the laying of the linoleum.

In the laying of linoleum it is a common practice in butt seaming pieces employing in covering a floor or other surface to use two tools in the preparation of the edges which are to abut in the formation of the seam, one to scribe a line on a piece in a position calculated to match in butting relation with an edge of another piece, and a cutting knife to cut off waste along the scribed line thereby to condition the edges for proper abutting relation. While this practice has been generally accepted, the operation is difficult, and, even when conducted with great skill, often results in the provision of an unsightly, uneven seam. A purpose of the invention is to avoid this difficulty by provision of the herein disclosed hand tool which serves the purpose of both scribing means and cutting means by reason of the fact that it includes a gage or guide means movable along an edge of one linoleum piece and which presents one of the seam margins, and a cutting means bearing a predetermined fixed relation to the gage means and which is effective as the tool is moved along over the linoleum to cut away a waste strip from a marginal portion of a second and overlying linoluem piece and provide an edge thereof conforming exactly with the gage contacted area with which it is to cooperate in the formation of the desired butt seam.

In its more detailed nature, the invention resides in the provision of a hand tool comprising a barlike body which is slidable along over two pieces of linoleum adhered to a floor or other surface being covered, with a marginal portion of one piece lapped over a marginal edge portion of the other piece, a gage carried by said body and disposed to contact and slide along said underlying edge to accurately guide movement of the body along and in exact conformity with said edge, and a cutter rigidly mounted on the body in cooperative relation to the gage for cutting through the overlapping marginal portion along a line exactly overlying and conforming with the gage contacted underlying edge, thereby to condition the cut edge to fit exactly against the gage contacted edge in the formation of a butt seam.

An object of the invention is to provide a tool of the character stated wherein the bar-like body has a recess in its linoleum opposing surface into which a gage carrying member projects in position for forming a shelf for supporting the overlapping marginal portion of the linoleum piece other than the one presenting the gage contacted edge, said recess also serving to receive said overlapping marginal portion, the cutter being in the form of a thin blade depending into the recess from a slot formed across the bar-like body directly over the gage.

Another object of the invention is to provide a tool of the character stated wherein the gage is in the form of a shoulder depending from the gage carrying member in vertical alignment with the cutting edge of the blade, the carrying member being slidably adjustable on the bar-like body for adjustment in the initial setting up of the tool and also for wear compensating purposes.

A further object of the invention is to provide a tool of the character stated wherein the blade is removably, but securely anchored in its cross slot mounting by a clamp screw bearing against the blade and accessible for tightening and loosening purposes through an end of the bar-like body.

With the above and other objects in view that will hereinafter appear, the nature of the invention will be more clearly understood by reference to the following detailed description, the appended claims and the several views illustrated in the accompanying drawings.

In the drawings:

FIGURE 1 is a side elevation of the tool, the relation thereof to overlapped marginal portions of linoleum being engaged in the formation of a butt seam being illustrated, and said marginal portions being shown in cross section.

FIGURE 2 is an inverted plan view of the tool looking at the linoleum engageable surface thereof and the gauge carrying member recessed therein.

FIGURE 3 is a right end elevation.

FIGURE 4 is a vertical cross section taken on the line 4—4 on FIGURE 1.

The novel hand tool disclosed herein does the work of two tools being used today by all linoleum installers: the scriber and the knife. Where a seam is needed in linoleum laying, the two pieces of linoleum are adhered to a floor or other surface being covered, one piece having a marginal portion overlapping a marginal portion of the other piece. Next, the scribe is used, in the present conventional practice, the purpose of this tool being to make scratch line on the overlapping piece of linoleum, showing where the cut must be made in order for the two pieces to go together properly in the making of the desired butt seam. Next, the at present conventional installer must take his linoleum knife and cut free hand along the scribed line. The novel hand tool disclosed and covered herein may be employed in cutting the overlapped linoleum margin in a single operation, exactly along the line which will match perfectly with the edge of the overlapped marginal portion in the formation of a perfect butt seam.

The improved hand tool comprises a heavy bar-like body 5, generally square in cross section, and having a bottom recess 6 in which to receive the waste margin or lap 7 of an integral piece 8 over which the bottom face portion 9 of the body 5 is slidable. The bottom face portion 10 of the bar-like body is slidable over the other or overlapped linoleum piece 11 which is intended for cooperation with the previously mentioned piece 8 in the formation of a desired butt seam. It will be apparent by reference to FIGURE 1 that the bottom face portions 9 and 10 are disposed in a common plane.

The bottom face portion 10 of the bar-like body 5 is recessed at 12 to receive the gage bar 13 which is adjustably-secured at 14 within the recess to provide for a limited amount of adjustment thereof along the bar-like body. The gage bar 13 carries a gage in the form of a downwardly bent end portion 15 which is engageable with and slidable along the edge of the underlapped linoleum piece 11 in the manner illustrated in FIGURE 1.

A cross slot 16 is provided in the bar-like body 5 and opens downwardly into the recess 6 directly over the gage 15, and a cutter blade 17 is mounted in said slot and extends below the same in the manner illustrated in FIGURE 1. The blade includes a bevelled and peaked cutting extremity 18, the bevel of the blade being directed toward the waste end of the marginal overlap 7, and the flat or non-bevelled face of the blade being in accurate alignment directly over the gaging face of the gage 15 which is presented for guiding contact with and movement along the edge of the linoleum piece 11.

The cutter blade 17 is clamped securely in the mounting slot 16 by a clamp screw 19 which is threaded at 20 into the threaded bore 21 formed in the block 5, and the screw is turnable to securely clamp, or loosen, the blade by proper wrench engagement with the head 22 which projects into and is accessible through the counterbore 23 opening through the right hand end of the bar-like body 5 as illustrated in FIGURES 1 and 2.

In the use of the tool, the tool is applied transversely over the overlapped marginal portions of the linoleum pieces 8 and 11, with the overlapping marginal portion 7 of the piece 8 received in the bar-like body recess 6 and supported, shelf-like, on the gage carrier 13 in the manner illustrated in FIGURE 1. With the parts in the condition shown in FIGURE 1, the tool is drawn along or slid over the liner pieces 8 and 11 and the overlapping marginal portion of the piece 8 will be cut away on a line perfectly registering over and exactly conforming to the edge extremity of the piece 11. Now, the edges of the pieces 8 and 11 may be brought together in the formation of a perfectly matching butt seam.

While a preferred example structure of the novel linoleum cutter is disclosed herein, it is to be understood that variations in some features may be made without departing from the spirit and scope of the invention as defined in the appended claims.

I claim:

1. A linoleum cutter of the character described comprising a bar-like body which is slidable along over two pieces of linoleum extending in opposite lateral directions and adhered to a floor or other surface being covered, with a marginal portion of one piece lapped over a marginal edge portion of the other piece, a gage carried by said body and disposed to project between said lapped marginal portions and contact the underlying or overlapped edge portion and accurately guide movement of the body along and in exact conformity with said underlying or overlapped edge portion, and a cutter rigidly mounted on the body in cooperative relation to the gage for cutting through the overlapping marginal portion along a line exactly overlying and conforming with the gage contacted underlying edge, thereby to condition the cut edge to fit exactly against the gage contacted edge in the formation of a butt seam, said bar-like body having a recess in its linoleum opposing surface into which a member carrying the gage projects in position for forming a shelf for supporting the overlapping marginal portion of the linoleum piece other than the one presenting the gage contacted edge, said recess also serving to receive said overlapping marginal portion and said cutter being in the form of a thin blade depending into the recess from a slot formed across the bar-like body directly over the gage, said gage being in the form of a shoulder depending from the gage carrying member in vertical alignment with the cutting edge of the blade, and said carrying member being slidably adjustable on the bar-like body for adjustment in the initial setting up of the cutter and also for wear compensating purposes.

2. A linoleum cutter of the character described comprising a bar-like body which is slidable along over two pieces of linoleum extending in opposite lateral directions and adhered to a floor or other surface being covered, with a marginal portion of one piece lapped over a marginal edge portion of the other piece, a gage carried by said body and disposed to project between said lapped marginal portions and contact the underlying or overlapped edge portion and accurately guide movement of the body along and in exact conformity with said underlying or overlapped edge portion, and a cutter rigidly mounted on the body in cooperative relation to the gage for cutting through the overlapping marginal portion along a line exactly overlying and conforming with the gage contacted underlying edge, thereby to condition the cut edge to fit exactly against the gage contacted edge in the formation of a butt seam, said bar-like body having a recess in its linoleum opposing surface into which a member carrying the gage projects in position for forming a shelf for supporting the overlapping marginal portion of the linoleum piece other than the one presenting the gage contacted edge, said recess also serving to receive said overlapping marginal portion, and said cutter being in the form of a thin blade depending into the recess from a slot formed across the bar-like body directly over the gage, the blade being removably but securely anchored in its cross slot mounting by a clamp screw bearing against the blade and accessible for tightening and loosening purposes through an end of the bar-like body.

3. A linoleum cutter of the character described comprising a bar-like body which is slidable along over two pieces of linoleum extending in opposite lateral directions and adhered to a floor or other surface being covered, with a marginal portion of one piece lapped over a marginal edge portion of the other piece, a gage carried by said body and disposed to project between said lapped marginal portions and contact the underlying or overlapped edge portion and accurately guide movement of the body along and in exact conformity with said underlying or overlapped edge portion, and a cutter rigidly mounted on the body in cooperative relation to the gage for cutting through the overlapping marginal portion along a line exactly overlying and conforming with the gage contacted underlying edge, thereby to condition the cut edge to fit exactly against the gage contacted edge in the formation of a butt seam, said bar-like body having a recess in its linoleum opposing surface into which a member carrying the gage projects in position for forming a shelf for supporting the overlapping marginal portion of the linoleum piece other than the one presenting the gage contacted edge, said recess also serving to receive said overlapping marginal portion, and said cutter being in the form of a thin blade depending into the recess from a slot formed across the bar-like body directly over the gage, said gage being in the form of a shoulder depending from the gage carrying member in vertical alignment with the cutting edge of the blade, and said carrying member being slidably adjustable on the bar-like body for adjustment in the initial setting up of the cutter and also for wear compensating purposes, the blade being removably but securely anchored in its cross slot mounting by a clamp screw bearing against the blade and accessible for tightening and loosening purposes through an end of the bar-like body.

4. A linoleum cutter of the character described comprising a bar-like body which is slidable along over two pieces of linoleum extending in opposite lateral directions and adhered to a floor or other surface being covered, wth a marginal portion of one piece lapped over a marginal edge portion of the other piece, a gage carried by said body and disposed to project between said lapped marginal portions and contact the underlying or overlapped edge portion and accurately guide movement of the body along and in exact conformity with said underlying or overlapped edge portion, and a cutter rigidly mounted on the body in cooperative relation to the gage for cutting through the overlapping marginal portion along a line exactly overlying and conforming with the gage contacted underlying edge, thereby to condition the cut edge to fit exactly against the gage contacted edge in the formation of a butt seam, said bar-like body having coplanar bottom portions disposed for sliding movement over two pieces of linoleum at opposite sides of and along overlapped marginal portions during the gaging and cutting incidental to the formation of a butt seam.

5. A linoleum cutter of the character described comprising a bar-like body which is slidable along over two pieces of linoleum extending in opposite lateral directions and adhered to a floor or other surface being covered, with a marginal portion of one piece lapped over a marginal edge portion of the other piece, a gage carried by said body and disposed to project between said lapped marginal portions and contact the underlying or overlapped edge portion and accurately guide movement of the body along and in exact conformity with said underlying or overlapped edge portion, and a cutter rigidly mounted on the body in cooperative relation to the gage for cutting through the overlapping marginal portion along a line exactly overlying and conforming with the gage contacted underlying edge, thereby to condition the cut edge to fit exactly against the gage contacted edge in the formation of a butt seam, said bar-like body having a recess in its linoleum opposing surface into which a member carrying the gage projects in position for forming a shelf for supporting the overlapping marginal portion of the linoleum piece other than the one presenting the gage contacted edge, said recess also serving to receive said overlapping marginal portion, said cutter being in the form of a thin blade depending into the recess from a slot formed across the bar-like body directly over the gage, said gage being in the form of a shoulder depending from the gage carrying member in vertical alignment with the cutting edge of the blade, and said carrying member being slidably adjustable on the bar-like body for adjustment in the initial setting up of the cutter and also for wear compensating purposes, and said bar-like body also having coplanar bottom portions disposed for sliding movement over two pieces of linoleum at opposite sides of and along overlapped marginal portions during the gaging and cutting incidental to the formation of a butt seam.

6. A linoleum cutter comprising a bar-like body which is slidable along over two pieces of linoleum extending in opposite directions and adhered to a floor or other surface being covered with a marginal portion of one piece lapped over a marginal portion of the other piece, said body having smooth large area coplanar bottom surfaces disposed for sliding movement over the linoleum pieces at opposite sides of said overlapped marginal portions of the linoleum pieces during a gaging and cutting incidental to the formation of a butt seam and said coplanar surfaces being spaced to provide between them a body recess overlying said overlapped marginal portions, a gage bar carried by the body and extending into the recess as a shelf receivable between the overlapped marginal portions and equipped with a gage disposed to slide along against the edge of the overlapped marginal portion and accurately guide movement of the body, and a cutter rigidly mounted on the body and depending into the recess in exact alignment with the gage for cutting through the overlapping marginal portion along a line exactly matching and overlying the gage contacted edge, thereby to condition the cut edge to fit exactly against the gage contacted edge in the formation of a butt seam.

7. A linoleum cutter as defined in claim 6 wherein the gage bar at the location of the body recess is spaced from the body a distance generally corresponding to the thickness of the linoleum and serves to support the overlapping marginal portion as the cutter is moving therethrough.

References Cited in the file of this patent

UNITED STATES PATENTS 213,712    Turner ---------------- Mar. 25, 1879